United States Patent
Bourque et al.

(10) Patent No.: US 7,055,683 B2
(45) Date of Patent: Jun. 6, 2006

(54) MULTIPLE COMPARTMENT POUCH AND BEVERAGE CONTAINER WITH SMOOTH CURVE FRANGIBLE SEAL

(75) Inventors: Raymond Anthony Bourque, Plymouth, MA (US); Daniel Young-Doo Chung, Chicago, IL (US); Richard M. Estabrook, Milford, MA (US); Diane McCauley Hahm, Boothwyn, PA (US); James L. Henderson, Wilmington, DE (US); Joseph Kornick, Chicago, IL (US); I-Hwa Lee, Wilmington, DE (US); Jose Tirso Olivares-Cordoba, Chicago, IL (US); Donna Lynn Visioli, Lower Gwynedd, PA (US); James P. Kane, Jr., Wilmington, DE (US)

(73) Assignees: E. I. du Pont de Nemours and Company, Wilmington, DE (US); Kornick Lindsay, Chicago, IL (US); Ocean Spray Cranberries, Inc., Lakeville Middleboro, MA (US)

( * ) Notice: Subject to any disclaimer, the term of this patent is extended or adjusted under 35 U.S.C. 154(b) by 0 days.

(21) Appl. No.: 10/454,233

(22) Filed: Jun. 2, 2003

(65) Prior Publication Data
US 2004/0118710 A1    Jun. 24, 2004

Related U.S. Application Data

(60) Provisional application No. 60/434,975, filed on Dec. 20, 2002.

(51) Int. Cl.
   *B65D 25/08* (2006.01)
(52) U.S. Cl. .................. 206/219; 383/40; 383/104; 604/410; 604/416

(58) Field of Classification Search ........ 206/219–221; 604/408–416; 383/38–40, 104
See application file for complete search history.

(56) References Cited

U.S. PATENT DOCUMENTS

| | | | | |
|---|---|---|---|---|
| 3,608,709 | A | * | 9/1971 | Pike ........................ 206/219 |
| 3,964,604 | A | | 6/1976 | Prenntzell |
| 4,539,263 | A | * | 9/1985 | Hoh ........................ 428/500 |
| 4,550,141 | A | * | 10/1985 | Hoh ........................ 525/221 |
| 4,602,910 | A | * | 7/1986 | Larkin ..................... 604/410 |
| 4,608,043 | A | * | 8/1986 | Larkin ..................... 604/87 |
| 5,114,004 | A | * | 5/1992 | Isono et al. .............. 206/222 |
| 5,209,347 | A | | 5/1993 | Fabisiewicz et al. |
| 5,287,961 | A | | 2/1994 | Herran |
| 5,423,421 | A | | 6/1995 | Inoue et al. |

(Continued)

FOREIGN PATENT DOCUMENTS

DE    20209034 U1    10/2002

(Continued)

OTHER PUBLICATIONS

Eva Backman, et al., Isometric Muscle Force and Anthropometric Values in Normal Children Aged Between 3.5 and 15 Years, Scand J Rehab Med 21, 1989, 105-114.

(Continued)

*Primary Examiner*—Bryon P. Gehman

(57) ABSTRACT

A polymeric film, multiple-compartment, pouch having an internal frangible seal for confining a fluid and related beverage container with a re-closable fitment for storing and delivering two different flavored liquids or the like. The frangible seal of the clear plastic pouch will burst when sustained squeezed thus allowing the flavors to swirl and mix within the pouch.

29 Claims, 12 Drawing Sheets

U.S. PATENT DOCUMENTS

| | | | |
|---|---|---|---|
| 5,425,587 | A | 6/1995 | Takiguchi |
| 5,492,219 | A | 2/1996 | Stupar |
| 5,860,743 | A | 1/1999 | Larkin et al. |
| 5,873,656 | A | 2/1999 | Arkins et al. |
| 5,898,050 | A | 4/1999 | Shih et al. |
| 5,944,709 | A * | 8/1999 | Barney et al. ............... 206/219 |
| 5,954,230 | A * | 9/1999 | Blette et al. ................... 222/1 |
| 6,007,529 | A * | 12/1999 | Gustafsson et al. ......... 604/410 |
| 6,024,220 | A * | 2/2000 | Smith et al. ................ 206/484 |
| 6,039,720 | A * | 3/2000 | Wieslander ................ 604/410 |
| 6,076,968 | A | 6/2000 | Smith et al. |
| 6,116,782 | A | 9/2000 | Arkins et al. |
| 6,117,123 | A | 9/2000 | Barney et al. |
| 6,138,849 | A | 10/2000 | Roemer et al. |
| 6,164,822 | A | 12/2000 | Beer |
| 6,164,825 | A | 12/2000 | Larkin et al. |
| 6,186,998 | B1 * | 2/2001 | Inuzuka et al. ............. 604/410 |
| 6,476,137 | B1 | 11/2002 | Longo |
| 6,612,428 | B1 * | 9/2003 | Segovia et al. ............. 206/219 |
| 6,655,837 | B1 * | 12/2003 | Matsuda et al. ............ 383/104 |
| 6,682,517 | B1 * | 1/2004 | Ezaki et al. ................ 604/410 |
| 6,743,451 | B1 * | 6/2004 | Rasile et al. ................ 426/112 |
| 6,866,145 | B1 * | 3/2005 | Richards et al. ............ 206/219 |
| 2002/0166779 | A1 * | 11/2002 | Etesse et al. ............... 206/219 |
| 2004/0238564 | A1 | 12/2004 | Bourque et al. |

FOREIGN PATENT DOCUMENTS

| | | |
|---|---|---|
| EP | 1010642 A1 | 6/2000 |
| EP | 0541715 B2 | 6/2004 |
| WO | WO 99/24086 A1 | 5/1999 |
| WO | WO 99/51509 A1 | 10/1999 |
| WO | WO 01/00502 A1 | 1/2001 |
| WO | WO 03/066831 A2 | 8/2003 |

OTHER PUBLICATIONS

Sheik N. Imrhan, et al., Trends in Finger Pinch Strength in Children, Adults, and the Elderly, Human Factors, 1989, 689-701, 31(6), The Human Factors Society, Inc.

PCT International Search Report for International application No. PCT/US03/40623, dated Sep. 28, 2004.

* cited by examiner

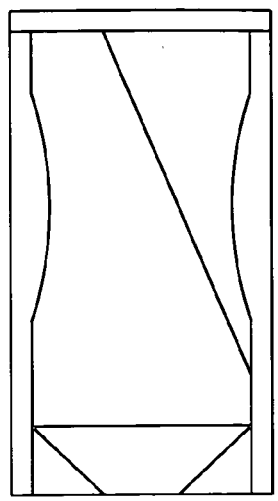
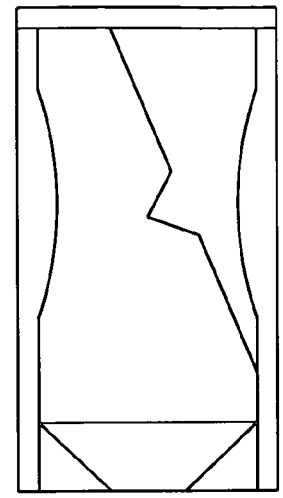
FIG. 5
FIG. 6
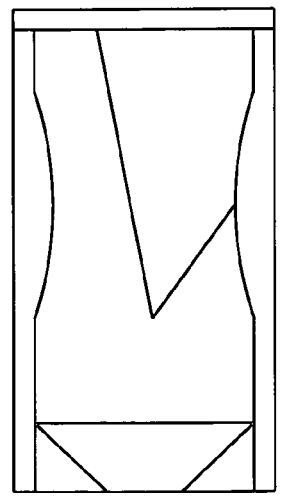
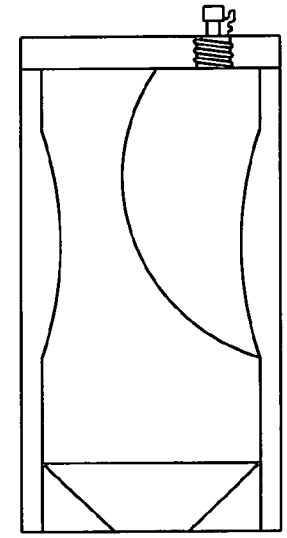
FIG. 7
FIG. 8

MULTIPLE COMPARTMENT POUCH AND BEVERAGE CONTAINER WITH SMOOTH CURVE FRANGIBLE SEAL

CROSS-REFERENCE TO RELATED APPLICATIONS

Applicants claim the benefit of priority to U.S. provisional application Ser. No. 60/434,975 filed Dec. 20, 2002.

BACKGROUND OF THE INVENTION

1. Field of the Invention

The present invention relates to a flexible pouch and related beverage container with an internal frangible seal to allow mixing of components in the pouch. More specifically but not by way of limitation, the present invention relates to a clear plastic pouch with re-closable fitment having two different flavored liquids in separated compartments wherein a sustained squeeze will burst the seal and swirl the flavors together.

2. Description of the Related Art

It is generally known in the art to use a flexible plastic pouch for packaging a variety of food related products including individual servings of a beverage. For example, U.S. Pat. Nos. 5,860,743; 6,076,968, and 6,164,825 disclose stable, flexible, easy open pouches wherein a straw can be readily inserted into the pouch through a frangible seal in a spill-preventing uppermost gusset and the pouch can be set upright on a plurality of coplanar feet. Also, a dual compartment stand-up pouch formed of flexible material for holding and simultaneously dispensing two separate paste-like materials in and from two separate but interconnected compartments is taught in U.S. Pat. No. 6,164,822. And, U.S. Pat. No. 5,209,347 discloses an internal W-shaped frangible seal line in a multi-chambered thermoplastic film package to isolate a dextrose solution from an amino acid solution prior to mixing them for intravenous medical treatment.

It is also generally known in the art that a frangible seal can be produced between heat-sealable films. For example, U.S. Pat. Nos. 4,539,263 and 4,550,141 disclose blends of partially neutralized ethylene/acid copolymer (i.e., ionomer) with minor amounts of propylene/acid copolymer to make heat-sealable films and laminates. Such structures are characterized by nearly constant peel strength over an extended heat seal temperature range. The blends are useful to manufacture heat-sealed flexible film packages having a seal of predictable and constant peel strength, in spite of inevitable variations in the heat seal temperature used in the production of such packages.

BRIEF SUMMARY OF THE INVENTION

The multiple compartment beverage pouches with frangible seal and reclosable fitment of the present invention afford the opportunity to conveniently and inexpensively deliver individual servings of multiple flavored drinks. In principle, the multiple flavored drink pouches can be used to sequentially deliver individual flavors or mixtures of flavors. By selecting the coloring and appearance of the separated flavored liquids a pleasing aesthetic or sensory effect can be achieved.

Thus the present invention provides a flexible multiple-compartment beverage pouch comprising:
(a) a first sheet of polymeric film;
(b) a second sheet of polymeric film superimposed on the first sheet of polymeric film wherein the first and second sheets of polymeric film are sealed to each other directly or indirectly through a third intervening polymeric film thus defining a sealed perimeter forming a closed pouch;
(c) at least one frangible seal internal to the perimeter of the closed pouch wherein the frangible seal divides the closed pouch into separated compartments;
(d) a liquid beverage confined to one of the separated compartments;
(e) another ingredient confined to a second separated compartment; and
(f) fitment.

In one embodiment of the multiple-compartment beverage pouch the ingredient confined to a second separated compartment is preferably a liquid concentrate; however, it is contemplated that a second liquid beverage or even a powder or an effervescence inducing solid would be acceptable alternatives.

The present invention also provides a flexible multiple-compartment pouch comprising:
(a) a first sheet of polymeric film;
(b) a second sheet of polymeric film superimposed on the first sheet of polymeric film wherein the first and second sheets of polymeric film are sealed to each other directly or indirectly through a third intervening polymeric film thus defining a sealed perimeter forming a closed pouch;
(c) at least one frangible seal internal to the perimeter of the closed pouch wherein the frangible seal divides the closed pouch into separated compartments; and
(d) a fluid confined to at least one of the separated compartments wherein the seal strength of the sealed perimeter of the closed pouch is sufficient to withstand manual compression of the fluid confined to at least one of the separated compartments and wherein the seal strength of the frangible seal is insufficient to withstand manual compression of the fluid confined to at least one of the separated compartments thus allowing the fluid after sufficient sustained manual compression to commingle with the contents of at least one other separated compartment.

In both the flexible multiple-compartment beverage pouch and the flexible multiple-compartment pouch according to the instant invention, the flexible film layers at the frangible seal delaminate preferably upon sustained manual compression, which produces a pressure increase within the separated compartment confining the liquid beverage of from 0.5 psig to 2.0 psig for youth applications and as high as about 12 psig for adult applications.

The frangible seal may have a seal strength of from about 130 to about 5,000 grams per inch, but conveniently for youth beverage applications the seal strength is between about 400 grams per inch up to about 2500 grams per inch and most preferably from 1,000 to 2,000 grams per inch. Thus the package is preferably designed such that a seal breaking force of between about 1,500 grams per inch and about 10,000 grams per inch is exerted on some or all of the frangible seal length upon sustained manual compression producing a pressure increase within the separated compartment confining the liquid beverage or fluid of from about 0.5 psig to about 10 psig and most preferably designed such that a seal breaking force of between about 400 grams per inch and about 6,000 grams per inch is exerted on some or all of the frangible seal length upon sustained manual compression producing a pressure increase within the separated compartment confining the liquid beverage or fluid of from about 0.5 psig to about 5 psig. However, even higher seal strengths and seal breaking forces may be contemplated for pouch and beverage applications operable by adults wherein the sustained manually induced pressure rise may approach 12 psig or even higher.

According to the present invention the frangible seal is preferably produced by heat-sealing the first sheet of polymeric film to the second sheet of polymeric film, wherein the inner surface of at least one and preferably both of said polymeric films comprises a blend of (a) 80 to 93 weight percent of an ethylene/acid ionomer wherein at least 50 weight percent of the ethylene/acid ionomer is derived from ethylene comonomer and wherein the degree of neutralization of acid is from 5 to 45 percent and (b) 20 to 7 weight percent of a propylene/α-olefin copolymer wherein the α-olefin comonomer comprises 1 to 12 weight percent of the copolymer.

Alternatively, the frangible seal is preferably produced by heat-sealing the first sheet of polymeric film to the second sheet of polymeric film, wherein the inner surface of at least one and preferably both of said polymeric films at the frangible heat seal are a blend of (a) an acid modified ethylene vinyl acetate (EVA) copolymer or acid modified ethylene methyl acrylate (EMA) copolymer as the major component and (b) a partially neutralized ethylene acid ionomer as the minor component.

Alternatively, the frangible seal is preferably produced by heat-sealing the first sheet of polymeric film to the second sheet of polymeric film, wherein the inner surface of at least one and preferably both of said polymeric films at the frangible heat seal are a blend of (a) a partially neutralized ethylene acid ionomer or ethylene acid copolymer as the major component and (b) polybutene-1 homopolymer or copolymers as the minor component.

Alternatively, the frangible seal is preferably produced by heat-sealing the first sheet of polymeric film to the second sheet of polymeric film, wherein the inner surface of at least one and preferably both of said polymeric films at the frangible heat seal are a blend of (a) a metallocene polyethylene as the major component and (b) polypropylene or polybutene-1 homopolymer or copolymers as the minor component.

It is a primary object of the present invention to provide a flexible multiple-compartment pouch and related beverage container that can be easily filled using conventional commercial equipment wherein the internal frangible heat-seal can be easily ruptured by a sustained manual squeeze but the outer perimeter of the multiple compartment pouch remains intact, and the pouch is robust enough to withstand conventional shipment and customer handling.

BRIEF DESCRIPTION OF SEVERAL VIEWS OF THE DRAWINGS

FIGS. 5 through 8 represent flat frontal views of four geometric configurations of a stand-up flexible film beverage pouch, less fitment, prior to being filled, according to the instant invention.

FIGS. 5A through 8A are individual plots of the calculated force (grams/inch) as a function of the relative distance exerted along the internal seam of the frangible seal for the respective geometric configurations of FIGS. 5–8 at three different pressures. The numerical values for the imposed peel force were based on a finite element model analysis applied to a filled and sealed beverage container experiencing three different pressure increases (1.0, 1.5, and 2.0 psig) in the major compartment.

DETAILED DESCRIPTION OF THE INVENTION

Although the present invention is predominantly described and illustrated herein in the preferred form or embodiment of a flexible, multi-compartment, beverage pouch, it should be appreciated that the underlying concepts and functionality of the instant invention are generally applicable to any flexible film pouch packaging system wherein a fluid (i.e., liquid, gas, paste, gel, slurry, or the like) is to be temporarily confined to a separate compartment until a frangible seal is ruptured by application of a manual compression of the flexible pouch; thus allowing the confined fluid to commingle with the contents of the adjacent and separate compartment. It should be further appreciated that the concept of a beverage pouch would include not only drinks such as juice, milk, tea and the like but also include yogurt and even more viscous fluids such as custards. As such, the concepts of selecting a polymeric film or multi-layered film, sealing the perimeter of a pouch and forming a frangible seal dividing the pouch into separate compartments are all aspects of the invention common to both pouch and beverage container embodiments.

Figure 2:
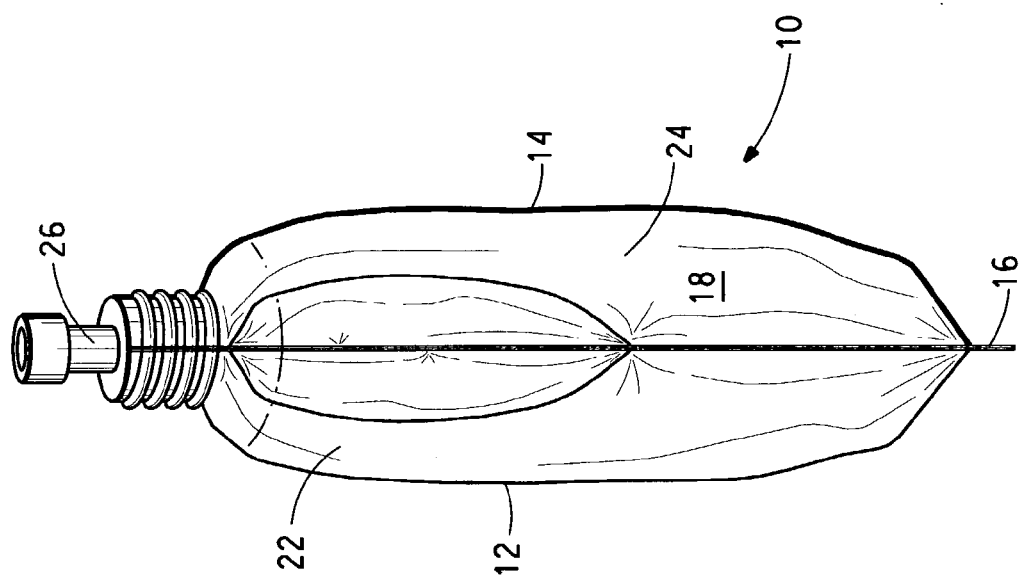
FIG. 2 represents a left side view of the embodiment of FIG. 1 as seen through line 2—2.
Figure 1:
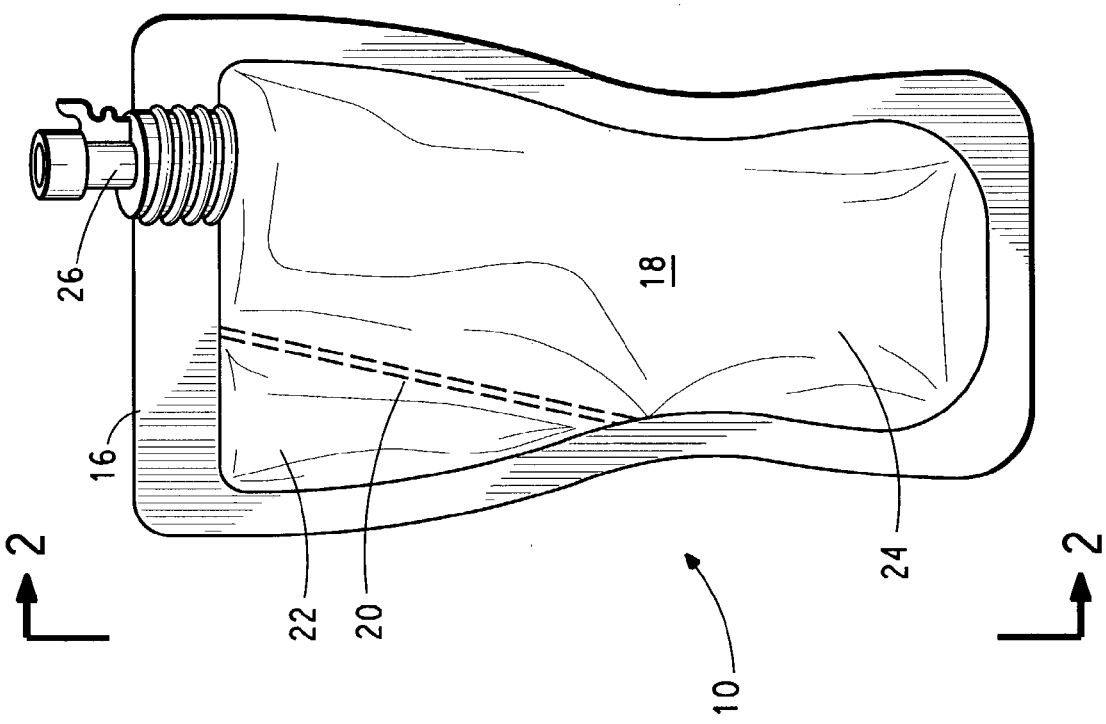
FIG. 1 represents a frontal perspective view of a two separate compartment, flat film, embodiments of the flexible beverage pouch, according to the instant invention.

To more fully appreciate how the present invention is to be used, how the properties of the polymeric film and frangible seal relate to the novel and advantageous method of use and how the resulting flexible packaging system differs from existing art can perhaps be best explained and understood by reference to the drawings. As illustrated in FIGS. 1 and 2, the flexible beverage container according to the present invention (generally designated by the number 10) typically involves two superimposed sheets 12 and 14 (see FIG. 2) of polymeric film circumferentially sealed at the perimeter or edge 16, thus forming a pouch 18 or alternatively a single sheet of film (not shown) folded back on itself and sealed along essentially three sides to close the pouch. Internal to the pouch 18 is a frangible seal 20 (see FIG. 1) dividing the beverage container 10 into two separated compartments 22 and 24. The beverage container is also equipped with a re-closable fitment 26 integrally sealed in the upper portion of the perimeter 16 of the pouch 18.

Figure 3:
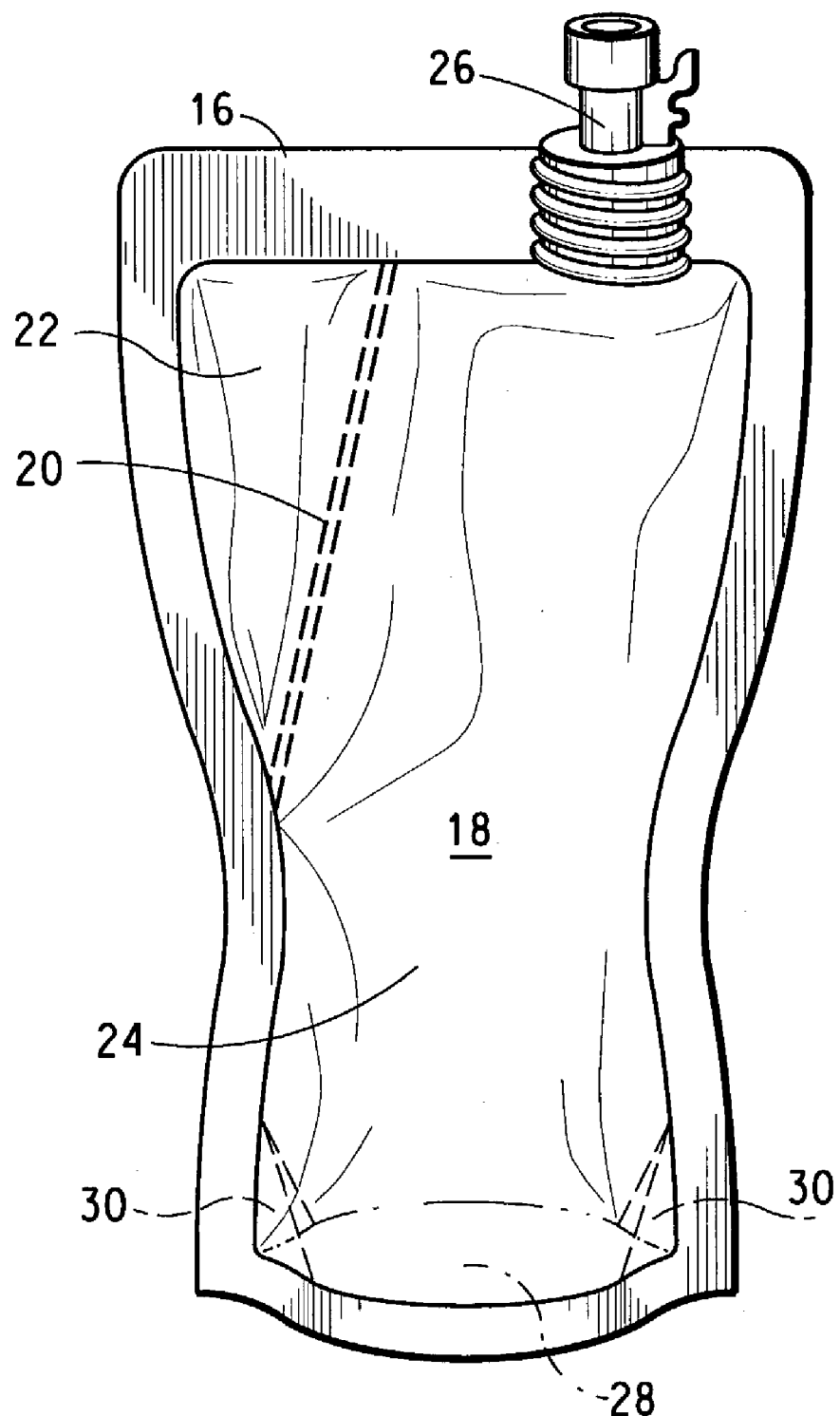
FIG. 3 represents a frontal perspective view of an alternate stand-up embodiment of the two separate compartment flexible beverage pouch, according to the instant invention.

FIG. 3 illustrates an alternate embodiment of a flexible beverage container 10 in the form of a two-compartment stand-up flexible film beverage pouch. The respective elements comprising this embodiment are identified by using the corresponding numbers employed in describing the beverage container illustrated in FIGS. 1 and 2. This embodiment differs from the previous beverage container of FIGS. 1 and 2 in that the bottom 28 involves a folded gusset structure 30 allowing the beverage container 10 with beverage to be freestanding. Such an embodiment also typically involves a more complex perimeter seal and/or folding configuration to create the gusset 30 and bottom surface 28.

Figure 4A:
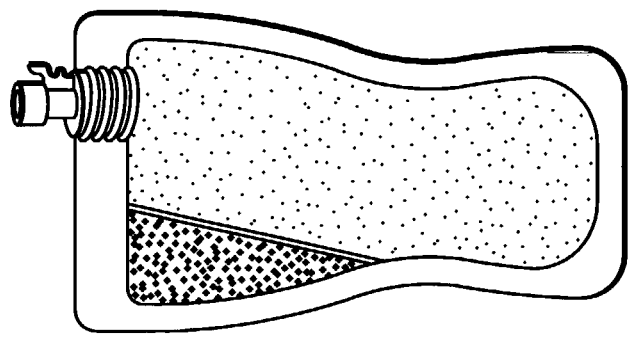
FIGS. 4A through 4C represent a perspective view of how one can sequentially use the flexible beverage pouch, according to the instant invention.
Figure 4B:
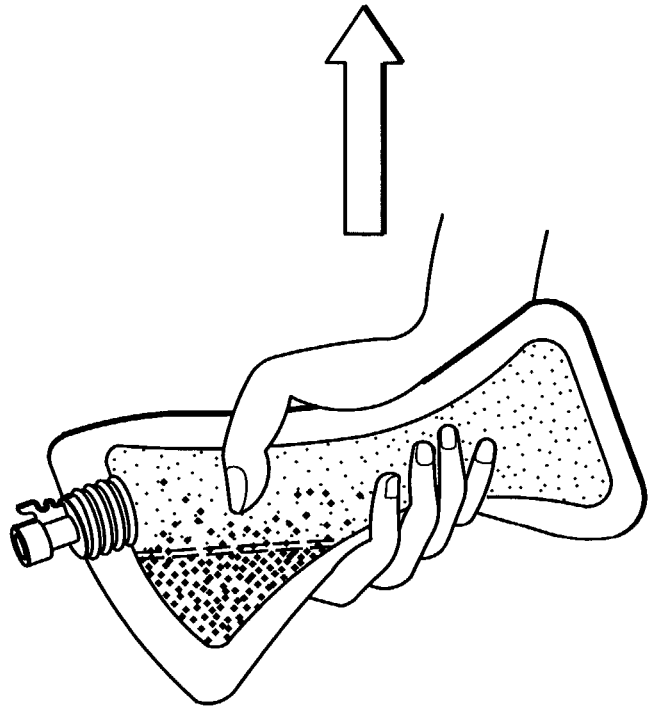
Figure 4C:
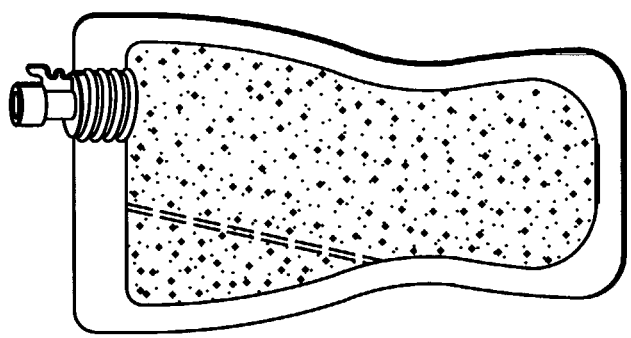
Figure 5A:
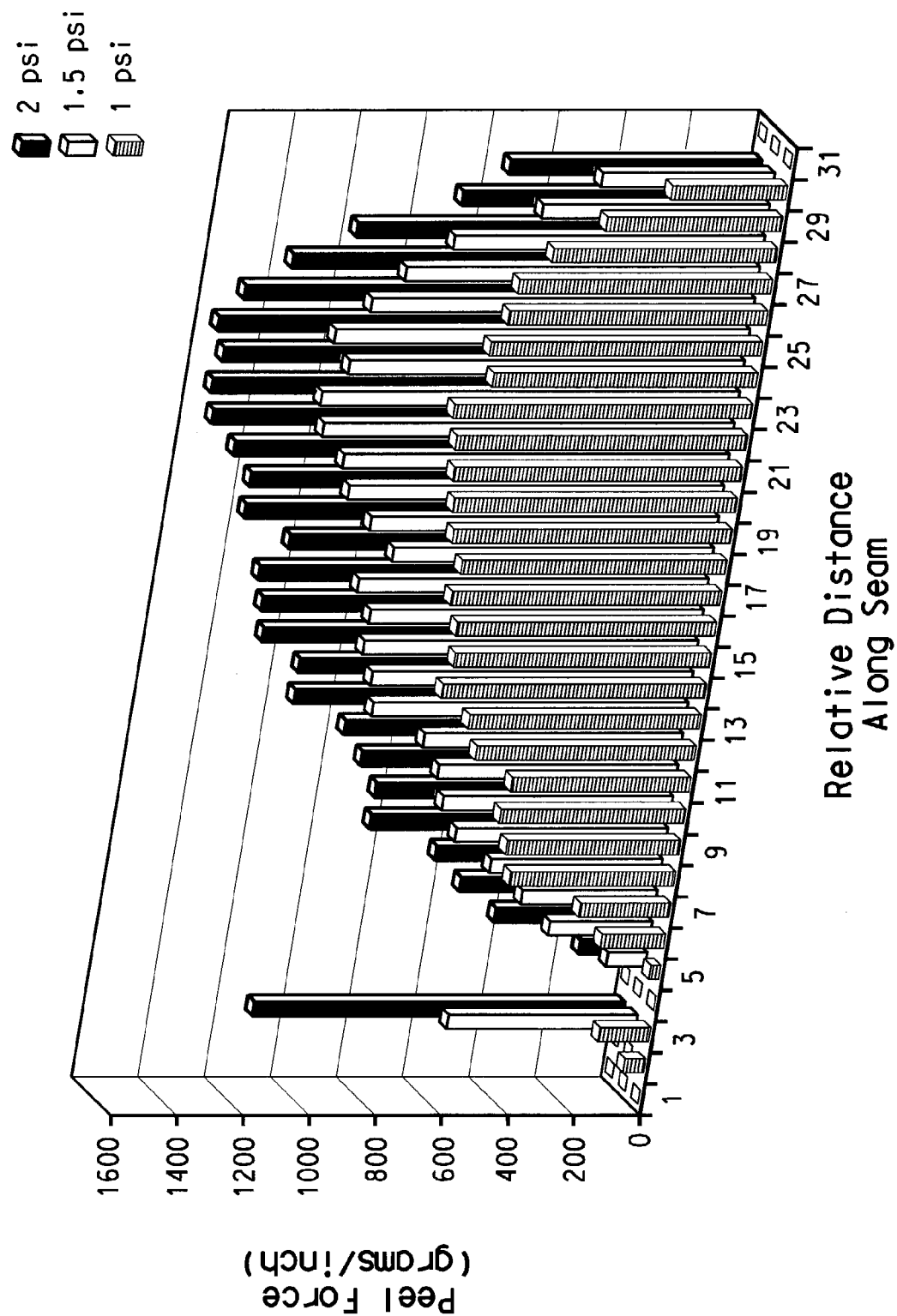
Figure 6A:
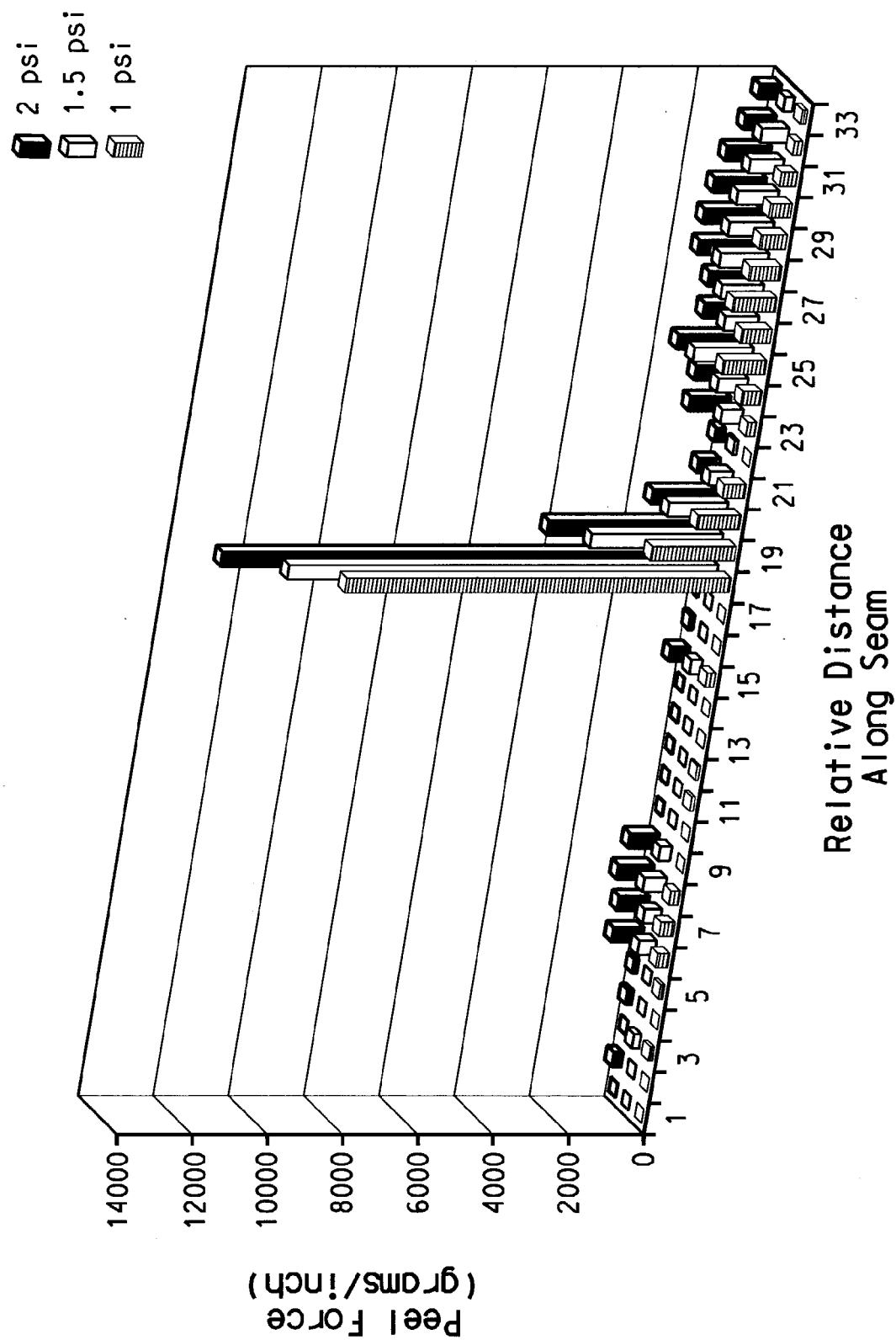
Figure 7A:
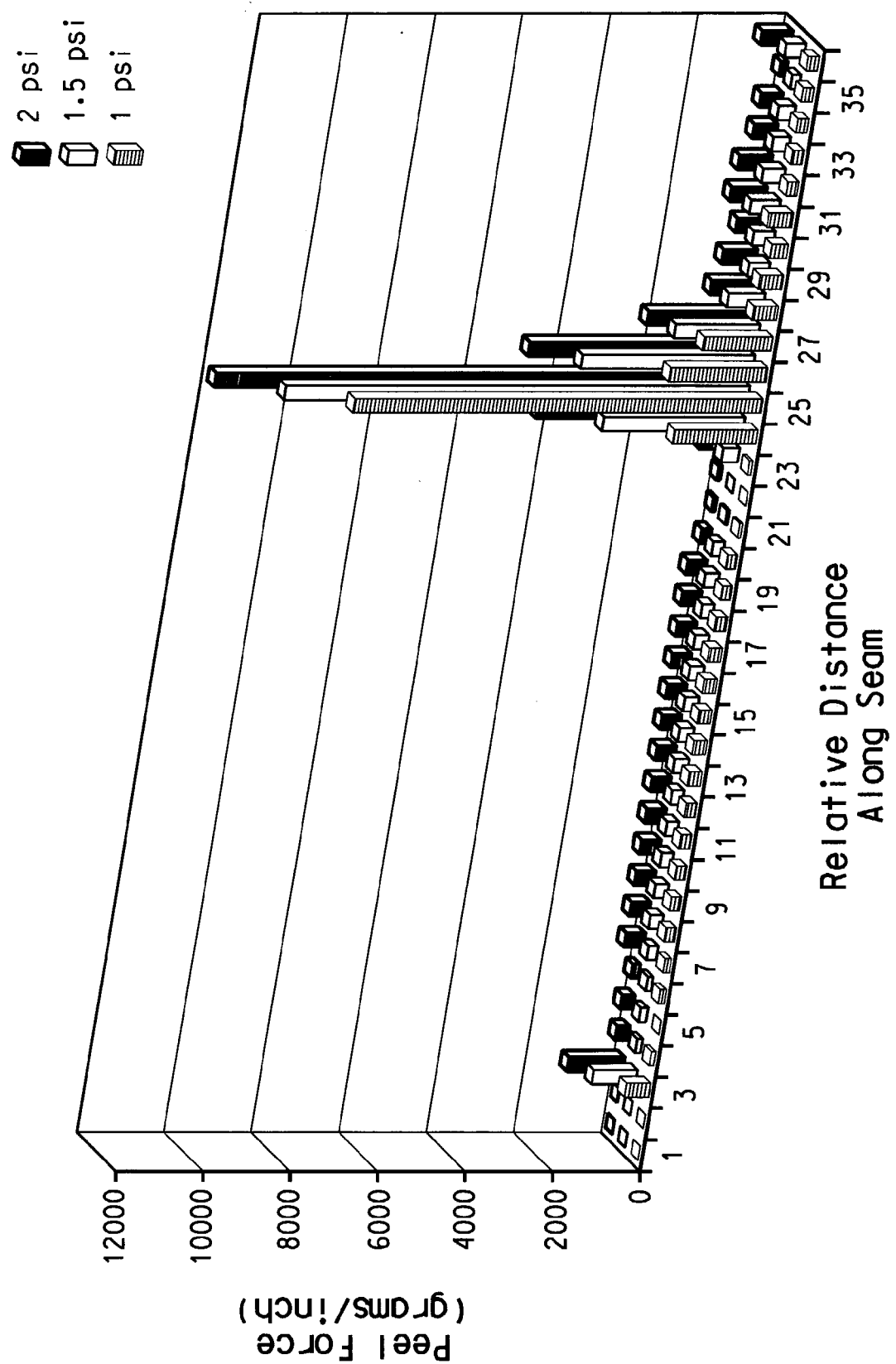

As sequentially illustrated in FIGS. 4A through 4C, the flexible two compartment beverage container illustrated in FIG. 1 prior to manual compression confines a second beverage, flavoring concentrate, other ingredient such as a fizzing agent and/or colorant, or the like to the smaller separated compartment isolated from the beverage in the larger compartment. Upon manually squeezing the flexible beverage pouch the force required to rupture the frangible seal between the two compartments is exceeded. Consequently, the frangible seal opens, the heat-sealed flexible film layers delaminate and the contents of the two previously separated compartments commingle. At the same time, the outer sealed perimeter of the beverage container remains intact in the face of this manual pressure. Thus drinking from the beverage container through the re-closable fitment after squeezing will produce a different flavor or effect than when drinking from the container before rupturing the frangible seal.

Figure 8A:
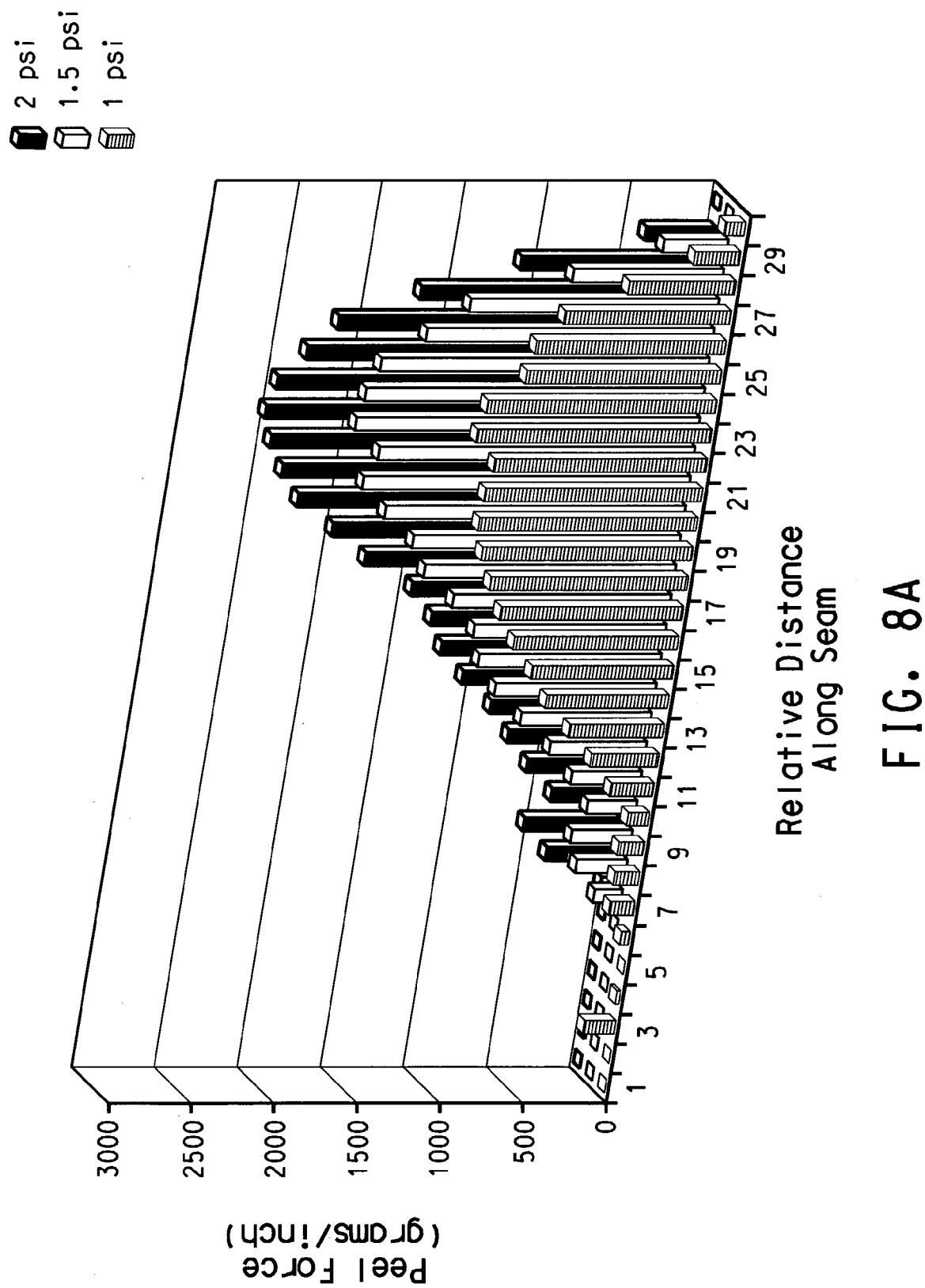

To further illustrate and understand the principle aspects employed in designing and constructing a flexible multiple compartment pouch and corresponding beverage container according to the instant invention, FIGS. 5 through 8 represent four typical configurations for the frangible seal within a two compartment flexible beverage pouch intended to be freestanding. As illustrated, FIGS. 5 through 8 represent the geometrical configurations of the folded and flat polymeric film pouch prior to being filled with a fluid or beverage and less the fitment or other closure. Using these configurations wherein the lines represent either permanent seals or folds in the sheet (as appropriate), a finite element model analysis was performed on the respective pouch configuration when filled with an incompressible liquid. The finite element model analysis was performed at three different pressure increases within the closed pouch; i.e., 1.0 psig, 1.5 psig, and 2.0 psig. The resulting force per unit length of seam exerted along the frangible seal was computed. FIGS. 5A through 8A represent plots of these calculated forces (grams/inch) as a function of the relative distance exerted along the seam of the frangible seal (i.e., arbitrary linear units based on relative resolution or grid of the finite element analysis). As illustrated in the respective plots, the force along the frangible seal is significantly influenced by the geometry (curvature) of the frangible seal and the magnitude of this force is also a function of the pressure induced by squeezing the pouch. FIGS. 6A and 7A, corresponding to the presence of a sharp point or apex in the frangible seal design, when compared to the essentially straight line frangible seal of FIG. 5A, clearly indicate that much higher force concentration at the apex of the point, i.e., sufficient to generate a seal breaking force, can be employed to control the location of the rupture as well as allow for the use of a more robust frangible seal (i.e., higher seal strength). Similarly, the smooth curve frangible seal configuration of FIGS. 8 and 8A show higher peel force at a given pressure rise relative to the straight line configuration for the frangible seal and also show localization of this increased force but not to the extent of the v-shaped apex configurations. In view of this it should be appreciated that the physical curvature and shape of the frangible seal become a means to concentrate the force for selectively exceeding the seal strength of the frangible seal. Thus the force concentrating means for selectively exceeding seal strength according to the instant invention has a broad range of equivalents essentially including any intentional deviation from a straight-line frangible seal. It should also be appreciated that FIGS. 5A through 8A suggest the opportunity to employ higher frangible seal strengths with force concentration means thus insuring rupture of even the most robust frangible seal. On the other hand, lower force concentration and rupture over relatively longer distance may possibly ensure better, easier, and/or faster mixing of the contents of separated compartments.

Figure 9:
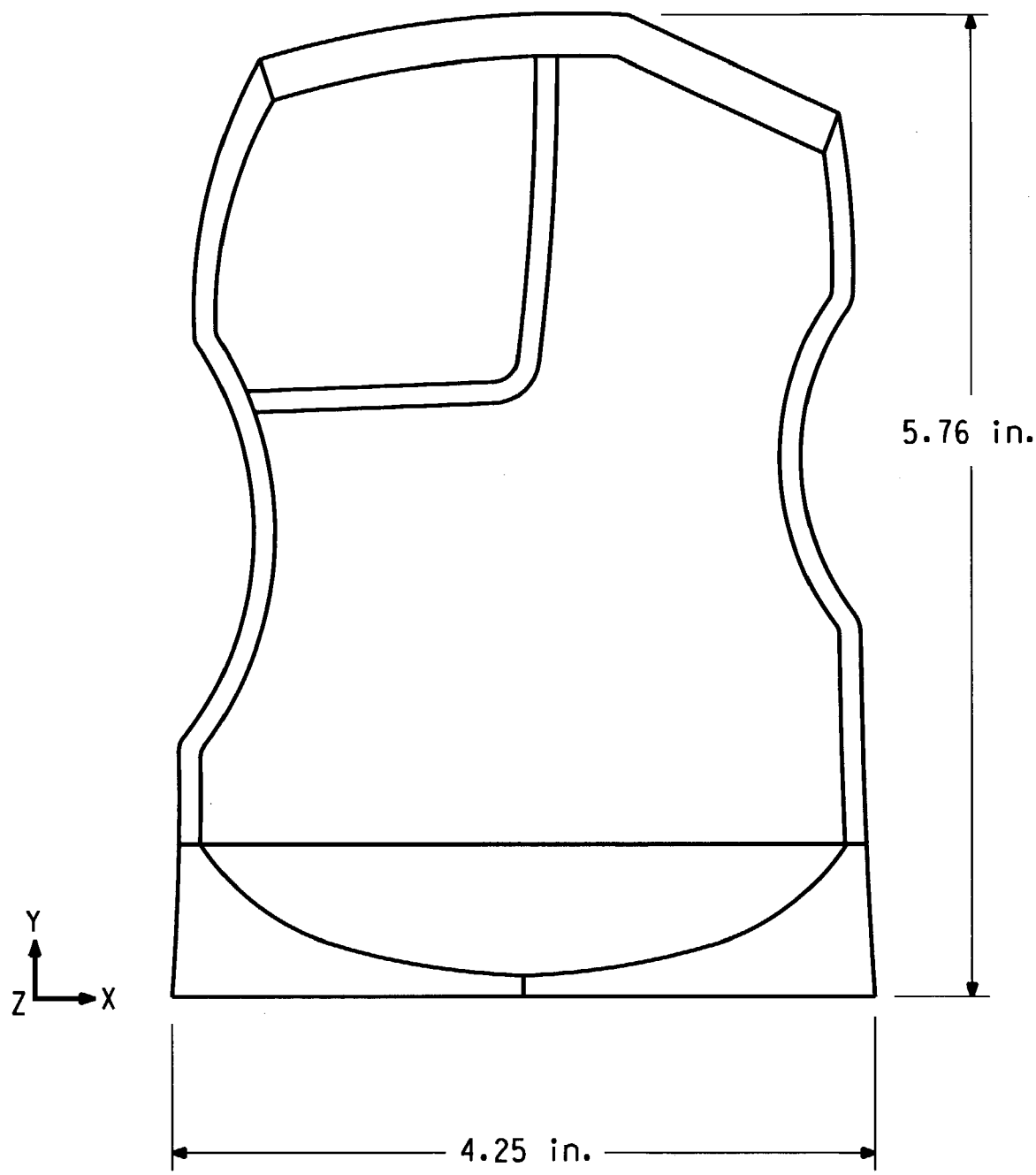
FIG. 9 represents a flat frontal view of a specific embodiment of a stand-up flexible film beverage pouch, less fitment, prior to being filled, nominally designed to have a small compartment of 2.4 mL and a total volume of 149 mL, according to the instant invention.
Figure 10:
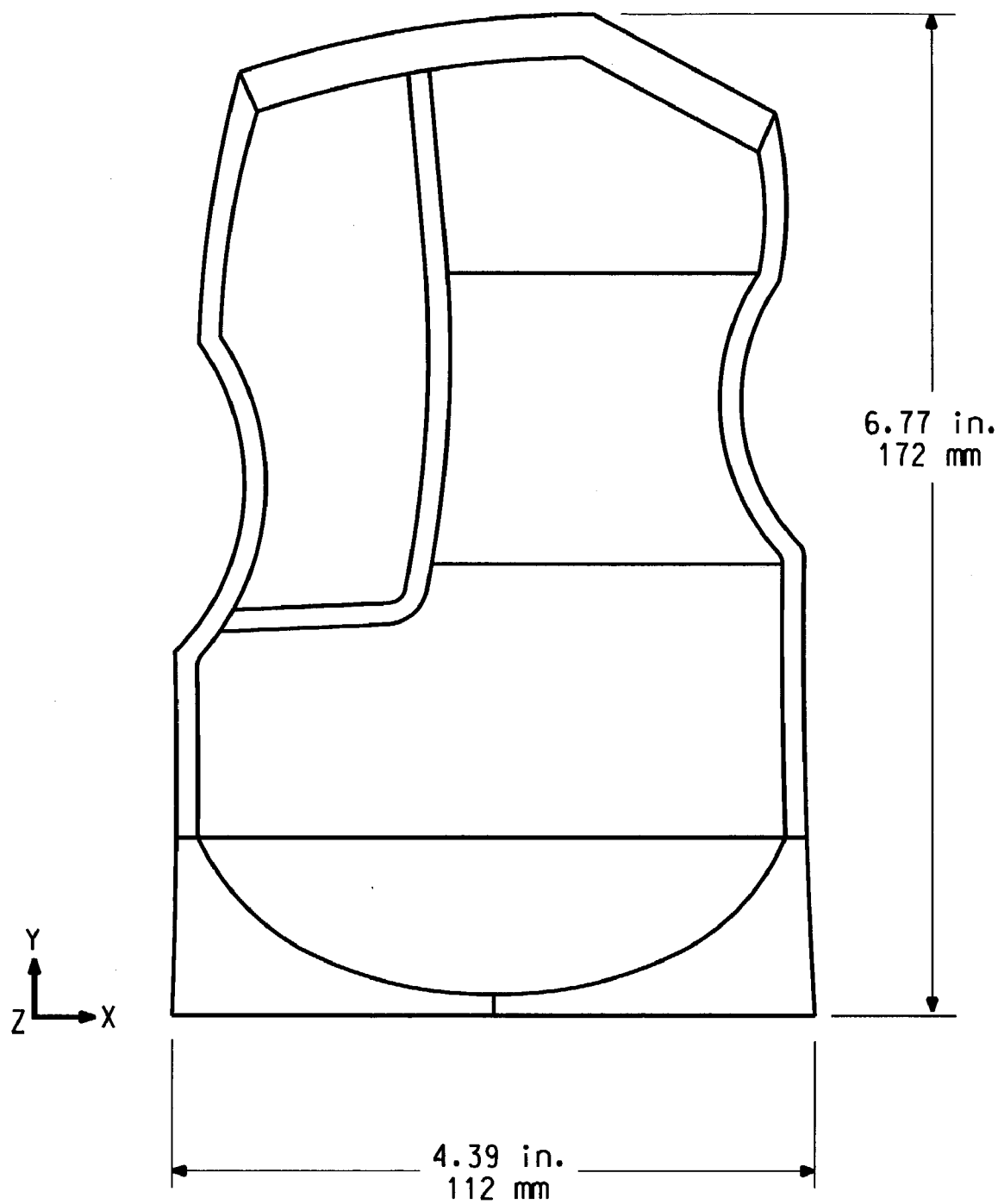
FIG. 10 represents a flat frontal view of another specific embodiment of a stand-up flexible film beverage pouch, less fitment, prior to being filled nominally designed to have a small compartment of 7.1 mL and a total volume of 196 mL, according to the instant invention.

FIGS. 9 and 10 illustrate alternate geometric configurations for specifically preferred embodiments directed to the children's juice-flavored beverage market. Similar to the previous FIGS. 5 through 8, what is being shown is the folded and flat profile of the polymeric film pouch prior to being filled with liquid drink. Again, the two-compartment flexible beverage pouch is intended to be freestanding with a folded gusset structure creating a bottom surface for supporting the pouch in an upright position. Also, the slightly sloped outer perimeter segment at the top right edge of the larger chamber is intended to accommodate a fitment or the like (not shown). The object of these two alternative embodiments is to establish that an individual youth size beverage serving can be packaged in the multiple compartment beverage pouch of the present invention. As such, the two compartment pouch of FIG. 9 is nominally 5.76 inches long (or tall) and 4.25 inches wide at the base with a nominal small chamber volume of 2.4 mL and a large chamber volume of 146 mL. The two compartment pouch of FIG. 10 is nominally 6.77 inches tall and 4.39 inches wide with a nominal small chamber volume of 7.1 mL and a large chamber volume of 189 mL. In principle the smaller compartment of FIG. 9 is directed to the use of a flavoring concentrate, powder, solid, or the like while the corresponding compartment of FIG. 10 is more compatible with the use of a second liquid flavoring diluent of slightly larger relative volume. In order to establish the acceptable utility of such structures in youth applications it is felt that the frangible seal must rupture easily at approximately a manually induced pressure rise of about 1.0 psig (i.e., preferably within the range of about 0.5 to about 2.0 psig sustained pressure rise), consistent with what is generally known and published relative to the hand strength of children: see for example, "Isometric Muscle Force and Anthropometric Values in Normal Children Aged Between 3.5 and 15 Years", Backman et al., Scand J Rehab Med 21: 105–114, 1989 and "Trends in Finger Pinch Strength in Children, Adults, and the Elderly", Imrhan et al., Human Factors, 31(6), 689–701, 1989. However, in pouch applications and adult beverage applications the acceptable manual sustained pressure rise range approaches 10 to 12 psig.

Figure 9A:
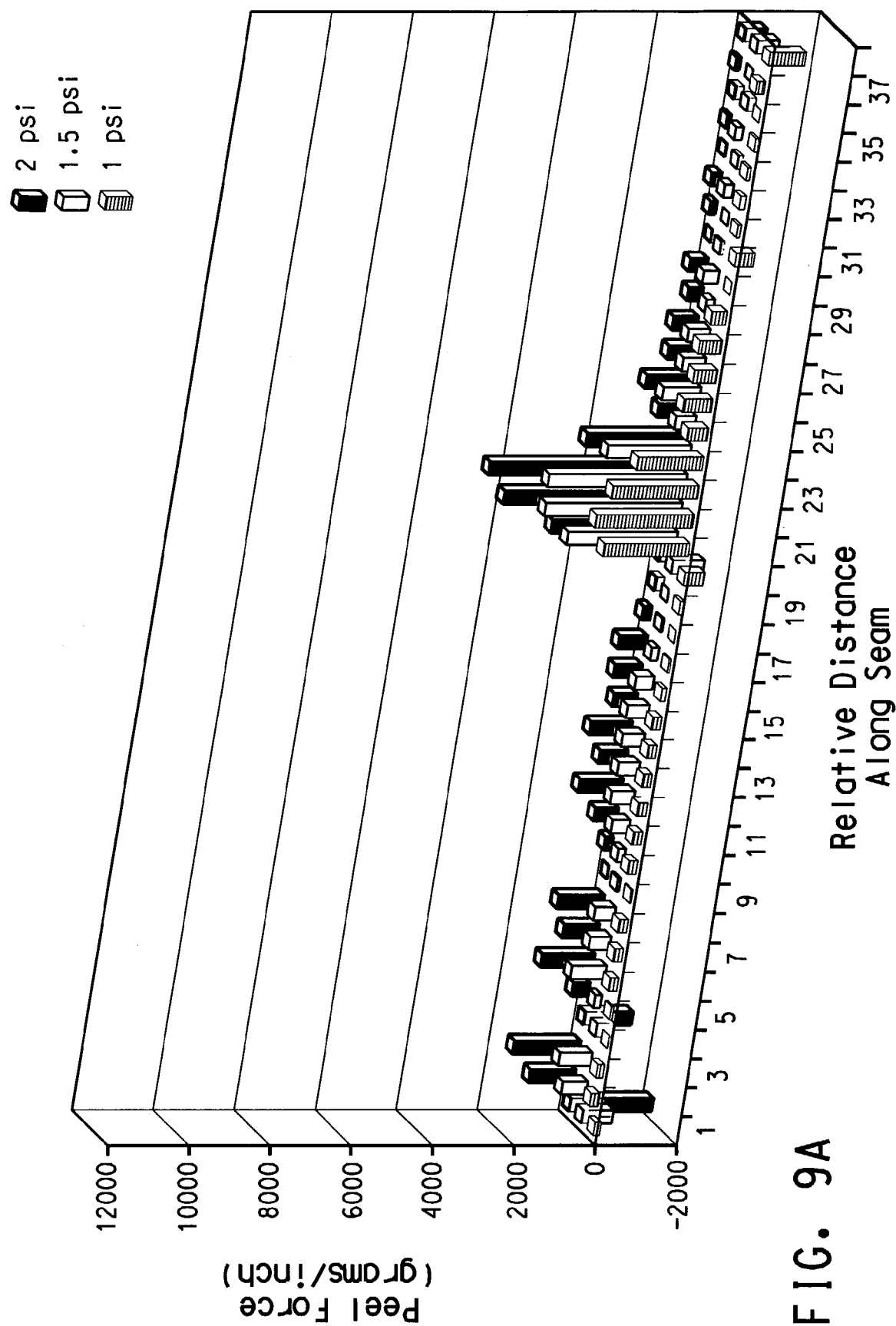
FIG. 9A is a plot of the calculated force (grams/inch) as a function of the relative distance exerted along the internal seam of the frangible seal for the beverage pouch of FIG. 9 using a finite element model analysis at three different imposed pressure increases.
Figure 10A:
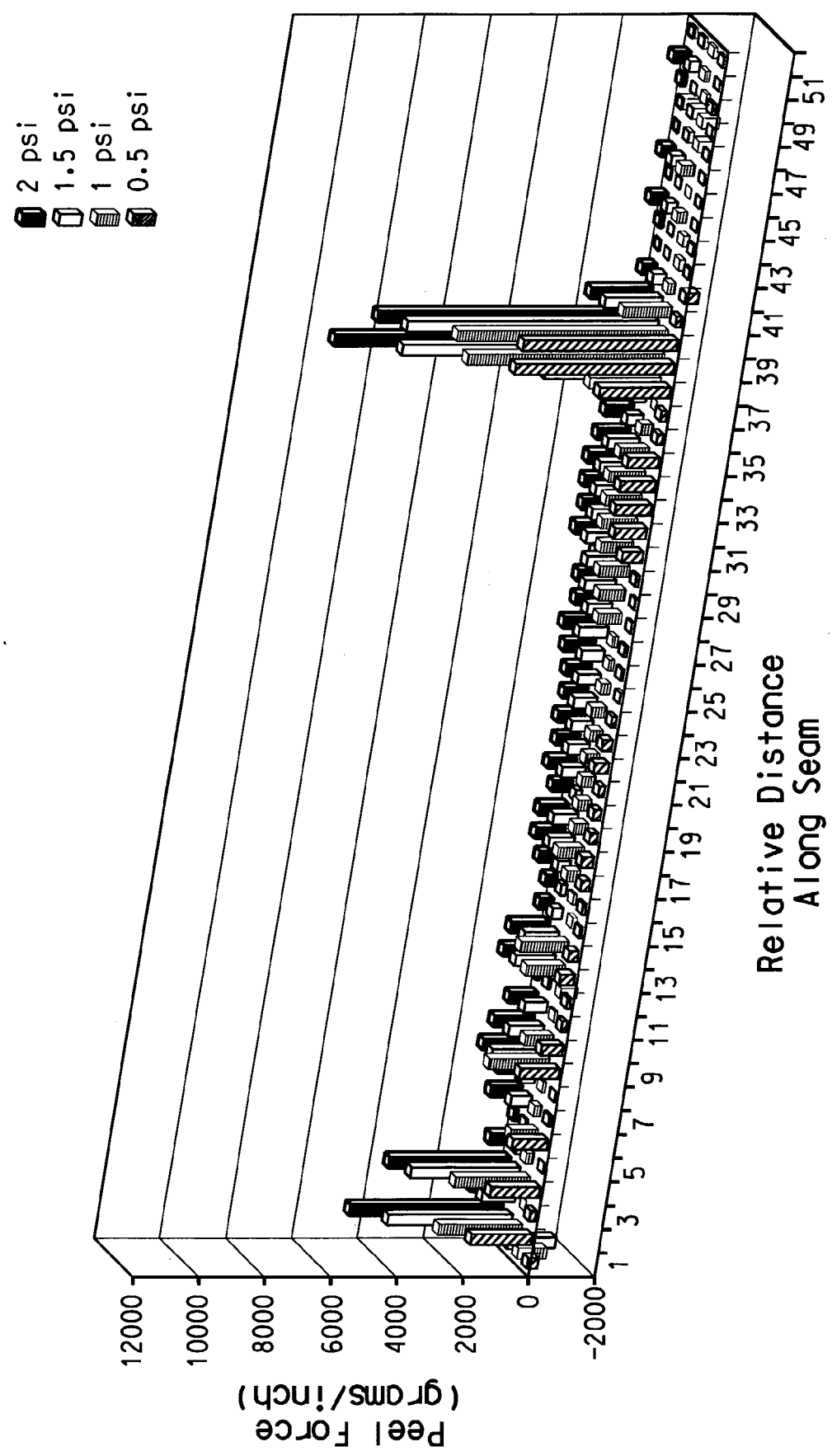
FIG. 10A is a plot of the calculated force (grams/inch) as a function of the relative distance exerted along the internal seam of the frangible seal for the beverage pouch of FIG. 10 using a finite element model analysis at four different imposed pressure increases.

FIGS. 9A and 10A represent the results of a finite element analysis performed on the respective pouch configurations again when filled with a liquid. As in the previous illustrations and computations, the finite element model analysis model analysis was performed at three different pressure increases (i.e., 1.0, 1.5, and 2.0 psig) for both FIGS. 9 and 10 as well as at a pressure increase of 0.5 psig for FIG. 10. Again, the plots of these data (FIGS. 9A and 10A) suggest that a child should be able to impose a seal breaking force in excess of about 1,500 grams/inch along specific portions of the frangible seal by squeezing the pouch.

In view of the above, individual youth size beverage containers according to the present invention are to be constructed and manufactured using a frangible seal that typically has a seal strength below the peak imposed peel force achieved by manually compressing the pouch. In other words, the frangible seal is to be constructed such as to withstand imposed forces that are inherently experienced during shipment, handling, and storage but not to withstand the imposed force associated with that experienced by sustained manual squeezing of the pouch. Of course it is to be understood that the polymer film or sheet strength of the walls of the pouch must withstand even the manual application of compression. And, the perimeter seals most preferably will be a lock-up heat seal or the like; i.e., corresponding to the strength required for elongation or tearing of the film or sheet in peeling apart and/or rupturing the outer perimeter seals apart. However, it is to be understood that while a lock up seal is preferred for the perimeter, it is within the scope of the instant invention for the perimeter seals to have high seal strengths without necessarily being lockup, so long as the frangible seal is weaker than the perimeter seal. Thus according to the instant invention the desired peeling or rupturing of the frangible seal will be achieved so long as the frangible seal is weaker than the perimeter seal; independent of the mechanism of seal failure (e.g., delamination, rupture, differential peel, interfacial peel, or the like).

For purposes of the present invention, the sheets of polymeric film employed to make the sidewalls of the flexible multiple-compartment pouch or beverage container, in principle, can be either a single layer or multilayer polymeric film. The sheets of film involved in the construction of the sidewalls do not necessarily have to be the same structure (e.g., one layer can be clear and the other can be opaque). Also, in principle, any such film grade polymeric resin or material as generally known in the art of packaging can be employed. Preferably, a multilayer polymeric film structure is to be employed. Typically the multilayer polymeric sheet will involve at least three categorical layers, including but not limited to, an outermost structural or abuse layer, an inner barrier layer, and an innermost layer and optionally one or more adhesive or tie layers there between. Also, the innermost layer making contact with and compatible with the intended contents of the pouch is preferably capable of forming both the lock up perimeter seals (i.e., seal strengths typically greater than 1,500 gram/inch) and internal frangible seal(s). Most preferably the innermost layer is also heat-sealable.

The outermost structural or abuse layer is typically oriented polyester or oriented polypropylene, but can also include oriented nylon or paper. This layer preferably is reverse printable and advantageously unaffected by the sealing temperatures used to make the pouch and chambers, since the pouch is sealed through the entire thickness of the multilayer structure. The thickness of this layer is typically selected to control the stiffness of the pouch, and may range from about 10 to about 60 µm, preferably about 50 µm.

The inner layer can include one or more barrier layers, depending on which atmospheric conditions (oxygen, humidity, light, and the like) that potentially can affect the product inside the pouch. Barrier layers can be metallized oriented polypropylene (PP) or oriented polyethylene terephthalate (PET), ethylene vinyl alcohol (EVOH), aluminum foil, nylon or biaxial oriented nylon, blends or composites of the same as well as related copolymers thereof. Barrier layer thickness will depend on the sensitivity of the product and the desired shelf life.

The innermost layer of the package is the sealant. The sealant is selected to have minimum effect on taste or color of the contents, to be unaffected by the product, and to withstand sealing conditions (such as liquid droplets, grease, dust, or the like). The sealant is typically a resin, which can be bonded to itself (sealed) at temperatures substantially below the melting temperature of the outermost layer so that the outermost layer's appearance will not be affected by the sealing process and will not stick to the jaws of the sealing bar. Typical sealants used in multilayer pouches include ethylene copolymers, such as low density polyethylene (LDPE), linear low density polyethylene (LLDPE), metallocene polyethylene (mPE), or copolymers of ethylene with vinyl acetate or methyl acrylate or copolymers of ethylene and acrylic acid (EM) or methacrylic acid (EMAA), optionally ionomerized (i.e., partially neutralized with metal ions such as Na, Zn, Mg, or Li). Typical sealants can also include polypropylene copolymers. Sealant layers are typically 25 to 100 µm thick. For the current invention, the sealant must be able to form a side compartment which will rupture and burst by squeezing, i.e. a frangible seal.

Preferably, the frangible seal is to be formed by heat-sealing two superimposed multilayer sheets of polymeric film each having the innermost sealant layer made from a resin, which undergoes interfacial peel sealing having different seal strengths when the heat seals are formed at different temperatures. Such resins include blends of one or more polyolefins such as: polyethylene including metallocene polyethylene with polybutylene or polypropylene including homopolymer or copolymers thereof (collectively: PE/PB blends; PE/PP blends); polypropylene with polybutylene (PP/PB blends); polypropylene with ethylene methacrylic acid copolymer (PP/EMAA blends); or polypropylene with styrene-ethylene/butylene-styrene block terpolymer (PP/SEBS blends). Alternatively the frangible seal can be produced by zone coating the innermost layer in the region of the seal with a sealant. Alternatively the frangible seal can be formed by heat sealing two dissimilar sealing surfaces such as an ionomer and ethylene copolymer. Particularly preferred are blends of an ionomer based on partial neutralization of an ethylene acrylic acid copolymer or ethylene methacrylic acid copolymer with a polypropylene α-olefin copolymer (EM or EMM ionomer blended with a PP/PB copolymer) as the innermost sealant layer, because the other blends are less reliable and the zone coating is more expensive. Such ionomer with polypropylene copolymer blends exhibiting predictable peel strength over an extended heat seal temperature range are disclosed in U.S. Pat. Nos. 4,550,141 and 4,539,263; herein incorporated by reference in their entirety. These particularly preferred polymeric blends when employed in the flexible multiple-compartment beverage pouch involve the inner surface of each of the polymeric films being a blend of (a) 80 to 93 weight percent of an ethylene/acid ionomer wherein the ionomer may be dipolymer or a terpolymer and at least 50 weight percent of the ethylene/acid ionomer is derived from ethylene comonomer and typically more than 8 weight percent is derived from acid comonomer and wherein the degree of neutralization of acid is from 5 to 45 percent and (b) 20 to 7 weight percent of a propylene/α-olefin copolymer wherein the α-olefin comonomer comprises 1 to 12 weight percent of the copolymer.

As taught and exemplified in the U.S. Pat. No. 4,550,141 patent, the selection of the amount of ethylene/methacrylic acid (EMAA) ionomer and propylene/ethylene copolymer employed as the blend making up the innermost sealant layer determines in part the peel strength of the frangible seal as a function of interface "heat-seal" temperature being employed in making the frangible seal. More specifically, the examples in this patent disclose the use of from about 5 weight percent PP/E (3% E) copolymer up to about 20 weight percent blended with EMAA ionomer (15% MAA; 22% neutralization with Zn). As further illustrated, at lower PP/E copolymer loading (e.g., 8%) the onset of a heat seal plateau of about 800 to 1070 g/in seal strength across the temperature range of about 90 to 120° C. progresses as a function of increased loading of PP/E copolymer (e.g., 20%) to a heat seal plateau of about 130 to 400 g/in seal strength across the temperature range of about 80 to 140° C.; see examples 1, and 6–9. Using this information or similar data measured by one skilled in the art relative to alternate sealant blends, the composition of the innermost sealant layer can be easily selected along with selecting a heat-seal temperature for fabricating the frangible seal, such as to produce a frangible seal with a predictable and desired range of peel force at rupture.

In order to manufacture a frangible seal containing at least one force concentrating means for selectively exceeding the seal strength of the frangible seal various alternative methodologies are contemplated. Preferably shape and/or curvature of the frangible seal is to be employed to advantageously concentrate the forces created when the pouch is manually compressed or squeezed. However, when zone coating of the heat seal resin is employed, the intentional reduction of the width of the zone coating or the like along the frangible seal can also be advantageously employed as a means to concentrate force for the purpose of exceeding seal strength selectively (with or without curvature). Also, the geometry and/or variable width of the (heated) heat seal bar employed to heat seal the frangible seal can be employed to produce a force concentrating means useful in the present invention. In principle and in fact, time-temperature sealing methods can also be employed to make a frangible seal containing a force concentrating means for selectively exceeding the seal strength of the frangible seal. For example but not by way of limitation, repetitive and/or multiple strikes of different heat seal bars can produce a frangible seal with variable seal strength that then serves as an equivalent structure to the claimed force concentrating means for selectively exceeding seal strength of said frangible seal.

For purposes of measuring the above mentioned seal strength, 4 inch by 6 inch samples of the polymeric film are to be cut with the long side of the samples in the machine direction of the film. Enough film samples are cut to provide one set of three specimens for each heat seal condition. The films then are folded so that the sealant layer of each side contacts the other. The film is then heat sealed between the jaws of the heat sealer at the appropriate temperature, time and pressure. The heat-sealed samples are then conditioned for at least 24 hours at 73° F. and 50% relative humidity before testing. The folded over portion of the sealed film is cut in half, forming suitable flaps to be placed in the Instron jaw clamps. One inch specimens are then cut in the machine direction of the film to provide at least three 1 inch wide test specimens at each set of sealing conditions.

The seal strength is measured by pulling the seals apart in the machine direction of the film using the Instron at 5 inches/minute jaw speed. In other instances, a pull rate of 12 inches/minute on the Instron may also be employed. The maximum force required to cause the seal to fail is then recorded, and the average of at least three specimens is reported in grams/25.4 mm (i.e., grams/inch).

Other particularly preferred blends of polymers for use as the frangible seal forming innermost layer include a combination of an ethylene vinyl acetate (EVA) copolymer or acid modified EVA copolymer and an ethylene methyl acrylate (EMA) copolymer or acid modified EMA as the major component and a polypropylene homopolymer or copolymer, a polybutylene homopolymer or copolymer, a partially neutralized ethylene acid ionomer or mixture of the ionomer with metallocene polyethylene as the minor component. Such polymeric systems and blends are available commercially as sealants from E. I. DuPont de Nemours & Company under the tradenames Appeel®, Bynel®, Elvax®, Nucrel® and Surlyn®. Again, various additives are frequently employed including, by way of example but not limited thereto, slip, antiblock, and/or chill role release agents and the like. Using these acid modified EVA and EMA based blends in combination with various other polymeric film layers, the heat seal strength can selectively range from 300 g/in up to 3,000 g/in with a lock-up heat seal strength in excess of 3,000 g/in.

During the manufacture of the polymeric film sheet to be used in making the pouch, co-extrudable adhesives are optionally used between functional layers to adhere the layers to each other and to provide structural integrity. These include but are not limited to, polymers and copolymers of ethylene or propylene modified with or grafted with unsaturated carboxylic acid groups such a maleic anhydride or maleic acid and the like. Also, to provide additional thickness (if desired by the consumer for a particular application), bulk layers of polyolefin or chopped remnants of the multilayer film trimmed during pouch fabrication can be incorporated within the multilayer structure. It is contemplated that the sheet of polymeric film (i.e., the so-called "web stock") may be produced using any combinations of the processes generally known in the art, such as monolayer or multilayer casting, blowing film, extrusion lamination, and adhesive lamination and combinations thereof. Processing aids as generally known in the art, including by way of example but not limited thereto; slip agents (such as amide waxes), antiblocking agents (such as silica), and antioxidants (such as hindered phenols), may be incorporated in the web stock if required to facilitate either manufacture of the film or pouch formation. Pouches are formed from web stock by either cutting and heat sealing separate pieces of web stock or by a combination of folding and heat sealing with cutting. Pouch making equipment such as that made by Totani Corporation, Kyoto, Japan or Klockner Barlelt Co., Gordonsville, Va. can be advantageously used practicing this invention. The frangible compartment can be installed either during or after pouch formation. It should be further appreciated that the heat sealed perimeter of the pouch according to the instant invention can be achieved by superimposing the first and second sheets of polymeric film and then heat sealing each directly to the other or heat sealing them indirectly through the use of an intervening third polymeric film, again as generally known and practiced in the art.

The beverage pouch embodiment must provide a mechanism to allow the consumer easy access to the contents. This can be achieved by insertion of a straw or preferably by use of a fitment or spout, such as those sold by Menshen Packaging USA, Waldwick, N.J. or Portola Packaging, San Jose, Calif. The fitment or spout is preferably sealed inside the top or side of the pouch. The fitment or spout is molded from a material that can be sealed to the pouch by induction, heat, or laser energy. The sealing can be done before or after filling the pouch, depending on the equipment used. Preferably when the fitment is employed for youth beverage pouch applications the fitment should be designed to be childproof such as taught in U.S. Pat. No. 6,138,849 and in copending and commonly assigned patent application docket number AD7005 US NA concurrently filed herewith, both incorporated herein by reference in their entirety.

Similarly, the flexible multiple-compartment pouch embodiment of the present invention can be provided with a mechanism to allow the consumer easy access to the contents of the pouch and as such the pouch embodiment can serve as a beverage pouch. In particular, but not by way of limitation, the pouch embodiment can be provided with an opening system, which can be pierced by a straw (i.e., a so-called straw hole or piercing opening) as generally known in the art: for example see U.S. Pat. Nos. 5,425,583; 5,873,656, and 6,116,782, incorporated herein by reference in their entirety.

EXAMPLES 1–18

In the examples below, a five layer co-extruded blown film was produced on a five layer blown film line to make an outer layer of LDPE of melt index 0.3 and density 0.918 g/cc, and adjacent adhesive layer of an anhydride modified polyethylene (Bynel® 4104), a barrier layer of an ethylene vinyl alcohol (Eval F101A), a second adhesive layer of an anhydride modified polyethylene (Bynel® 41 E687), and an inner sealant layer containing a melt blend of 10 weight percent random polypropylene copolymer of melt flow rate 7 and melt point 135° C. and 90 weight percent ethylene ionomer terpolymer containing 10 weight percent methacrylic acid and 10 weight percent isobutyl acrylate with 15% of the acid groups neutralized by zinc. The LDPE was melted at 219° C. in a 63.5 mm single screw extruder operating at 62 rpm. The EVOH was melted at 211° C. in a 50.8 mm single screw extruder operating at 27 rpm. Bynel® 4104 was melted at 215° C. in a 50.8 mm single screw extruder operating at 34 rpm. Bynel® 41 E687 was melted at 196° C. in a 50.8 mm single screw extruder operating at 12 rpm. The ionomer blend was melted at 223° C. in a 63.5 mm single screw extruder operating at 13 rpm. The blown film was corona treated on the PE layer and laminated to a 48 gauge oriented polyester (Mylar® LBT). The PE layer was 71 microns, the adhesive layers were 8 microns each, the barrier layer was 13 microns and the inner sealant layer was 28 microns. The film was then heat sealed to itself with 3 mm wide heat seal bars, with both bars heated at a pressure of 275 kilo-Pascals and at the temperatures and dwell times described in the examples. The films were then tested on the Instron, as described earlier, with the Instron being pulled at 12 inches/minute. As can be seen from these examples, the level of heat seal strength can be readily controlled by application of the appropriate temperature and time to make the seal, and thus the required seal strength to provide frangibility at about 5000 gm/inch or less, or to provide lock up seals at 8000 gm/inch or greater. The resulting data are presented in the following Table 1.

TABLE 1

| Example | DwellTime seconds | BarTemp ° F. | Heat Seal Strength, gm/inch |
|---|---|---|---|
| 1 | 0.5 | 200 | 340 |
| 2 | 0.75 | 200 | 497 |
| 3 | 0.75 | 240 | 6325 |
| 4 | 0.5 | 200 | 229 |
| 5 | 0.75 | 200 | 531 |
| 6 | 1 | 200 | 1042 |
| 7 | 1 | 240 | 9975 |
| 8 | 0.75 | 240 | 9932 |
| 9 | 0.5 | 240 | 1467 |
| 10 | 1 | 220 | 3285 |
| 11 | 0.75 | 220 | 1770 |
| 12 | 0.5 | 240 | 1697 |
| 13 | 1 | 200 | 1306 |
| 14 | 1 | 240 | 9617 |
| 15 | 0.5 | 220 | 1078 |
| 16 | 1 | 220 | 3306 |
| 17 | 0.75 | 220 | 1694 |
| 18 | 0.5 | 220 | 942 |

EXAMPLES 19–26

In the examples below, similar five layer co-extruded blown films were produced on a commercial blown film line to make similar structures as described in Examples 1–18. For these examples, the films had an outer layer of LLDPE, an adjacent adhesive layer of an anhydride modified polyethylene (Bynel® 41 E687), a barrier layer of an ethylene vinyl alcohol (Eval F101A), a second adhesive layer of an anhydride modified polyethylene (Bynel® 41 E687), and an inner sealant layer containing a melt bend of 10 weight percent random polypropylene copolymer of melt flow rate 7 and melt point 135° C. and 90 weight percent ethylene ionomer terpolymer containing 10 weight percent methacrylic acid and 10 weight percent isobutyl acrylate with 15% of the acid groups neutralized by zinc. The blown film was either 100 or 125 microns thick. The 100-micron thick film comprised of the LLDPE layer at 53 microns, the tie layer at 5 and 7 microns, the EVOH layer at 10 microns and the ionomer layer at 25 microns. The 125-micron thick film comprised of the LLDPE layer at 65 microns, the tie layer at 5 and 7 microns, the EVOH layer at 15 microns and the ionomer layer at 33 microns. Both films were corona treated on the PE layer and laminated to a 48 gauge oriented polyester (Mylar® LBT). The films were then made into pouches similar to that described in FIG. 9 on a commercial Totani pouch machine. The various conditions at which the frangible chamber was manufactured are described in the Table 2 below. One-inch wide strips containing the frangible seal were cut perpendicular to the vertical frangible seal compartment. Ten such strips taken from five pouches of each example were subsequently tested on the Instron at 12 inches/minute, with the average reported in the column labeled heat seal strength. The internal pressure required to rupture the frangible chamber of these pouches were tested as follows. A bulkhead fitting of a 0.25 inch male pipe thread with ⅛ inch compression was affixed to the main chamber of the pouch, and connected by ⅛ inch tubing to a Sensotech model #7/1786-08 pressure transducer. During testing, the output of this transducer was fed into a Sensotech model # 2310 signal amplifier and plotted using the appropriate computer software. The pouch was filled with water in the main chamber, and then sealed completely so that no leakage occurred in the vicinity of the valve or in the perimeter seals. The pouch was placed on a circular 5 and ⅞ inch platen lower jaw of the Instron, and the upper twin jaw was then exerted onto the pouch at a rate of 2 inches/minute until the frangible seal between the two chambers ruptured. The maximum internal pressure required to burst the frangible seal was then recorded. The column in the table below reflects the average of three such readings for each example.

As can be seen from these examples 18 through 26, the level of heat seal strength can be readily controlled by application of the appropriate temperature and time to make the seal. The internal pressure to burst the frangible seal without rupturing the outermost perimeter seals of the pouch varied from 0.6 psig to 8.3 psig.

TABLE 2

| Example | Blown Film Thickness microns | Frangible seal bar conditions | | Heat Seal Strength gm/25 mm | Pressure to burst Frangible chamber psig |
|---|---|---|---|---|---|
| | | Bar temperature, ° F. | Dwell time, msecs | | |
| 19 | 100 | 260 | 700 | 822 | 0.9 |
| 20 | 100 | 290 | 700 | 1286 | 1.7 |
| 21 | 100 | 300 | 500 | 1704 | 0.6 |
| 22 | 100 | 320 | 500 | 5444 | 5.7 |
| 23 | 100 | 325 | 400 | 2070 | 1.2 |
| 24 | 125 | 310 | 700 | 1396 | 1.5 |
| 25 | 125 | 320 | 700 | 2246 | 4.4 |
| 26 | 125 | 320 | 600 | 3597 | 8.3 |

The benefits and advantages of the instant invention are felt to be numerous and significant. First and foremost the invention provides an easily fill, easily ruptured, but robust multiple compartment pouch that can be manufactured inexpensively using conventionally known commercial equipment. The pouch and/or individual beverage drink container according to the present invention provides a method for retaining various contents and components within the package temporarily isolated from each other and subsequently commingled at the user's discretion. This in turn affords the opportunity to produce a variety of novel and aesthetically pleasing effects and benefits when using the packaging system. In fact it is felt that the arbitrary number, size, shape, and sequential controlled rupturing of frangible seals afforded the user by virtue of the instant invention, represents a virtually unlimited breadth of novel packaging alternatives and aesthetic functional effects.

Having thus described and exemplified the invention with a certain degree of particularity, it should be appreciated that the following claims are not to be so limited but are to be afforded a scope commensurate with the wording of each element of the claim and equivalents thereof.

We claim:

1. A flexible multiple-compartment beverage pouch comprising:
    (a) a first sheet of polymeric film;
    (b) a second sheet of polymeric film superimposed on said first sheet of polymeric film wherein said first and second sheets of polymeric film are sealed to each other directly or indirectly through a third intervening polymeric film thus defining a generally rectangular sealed perimeter having a first end and a second end and two opposed sides, forming a closed pouch;
    (c) at least one smooth curve frangible seal internal to the sealed perimeter and said at least one smooth curve frangible seal divides said closed pouch into separated compartments comprising a first compartment and a second compartment;
    (d) the first compartment comprises or confines a liquid beverage;
    (e) the second compartment comprises or confines another ingredient; and
    (f) a fitment in said first end;
    wherein the second end is the end opposing the fitment and the at least one smooth curve seal extends from said first end to one of said opposed sides.

2. A flexible multiple-compartment beverage pouch of claim 1 wherein said another ingredient is a liquid flavoring concentrate.

3. A flexible multiple-compartment beverage pouch of claim 1 wherein said at least one smooth curve frangible seal delaminates upon sustained manual compression producing a pressure increase within the first compartment of up to 12 psig.

4. A flexible multiple-compartment beverage pouch of claim 1 wherein said at least one smooth curve frangible seal delaminates upon sustained manual compression producing a pressure increase within the first compartment of from 0.5 psig to 2.0 psig.

5. A flexible multiple-compartment beverage pouch of claim 1 wherein said at least one smooth curve frangible seal has a seal strength of front 130 grams per inch to 5,000 grams per inch.

6. A flexible multiple-compartment beverage pouch of claim 5 wherein said seal strength is from 400 grams per inch to 2,500 grams per inch.

7. A flexible multiple-compartment beverage pouch of claim 5 wherein said seal strength is from 1,000 grams per inch to 2,000 grams per inch.

8. A flexible multiple-compartment beverage pouch of claim 1 wherein said at least one smooth curve frangible seal experiences a seal breaking force of between 400 grams per inch and 6,000 grams per inch upon sustained manual compression producing a pressure increase within the first compartment of from 0.5 psig to 5.0 psig.

9. A flexible multiple-compartment beverage pouch of claim 1 wherein said at least one smooth curve frangible seal contains at least one force concentrating means for selectively exceeding seal strength of said at least one smooth curve frangible seal by experiencing a seal breaking force of from 1,500 grams per inch up to 10,000 grams per inch at a pressure increase within said first compartment of from 0.5 psig to 10 psig.

10. A flexible multiple-compartment beverage pouch as in claim 1, 2, 3, 4, 5, 6, 7, 8, or 9 wherein said at least one smooth curve frangible seal is produced by heat-sealing said first sheet of polymeric film to said second sheet of polymeric film and wherein the inner surface of at least one of said polymeric films comprises a blend of (a) 80 to 93 weight percent of an ethylene/acid ionomer wherein at least 50 weight percent of said ethylene/acid ionomer is derived from ethylene comonomer and wherein the degree of neutralization of acid is from 5 to 45 percent and (b) 20 to 7 weight percent of a propylene/α-olefin copolymer wherein the α-olefin comonomer comprises 1 to 12 weight percent of said copolymer.

11. A flexible multiple-compartment beverage pouch as in claim 1, 2, 3, 4, 5, 6, 7, 8, or 9 wherein said at least one smooth curve frangible seal is produced by heat-sealing said first sheet of polymeric film to said second sheet of polymeric film and wherein the inner surface of at least one of said polymeric films at the frangible seal is a blend comprising (a) an acid modified ethylene vinyl acetate copolymer or acid modified ethylene methyl acrylate copolymer as the major component and (b) a partially neutralized ethylene acid ionomer as the minor component.

12. A flexible multiple-compartment beverage pouch as in claim 1, 2, 3, 4, 5, 6, 7, 8, or 9 wherein said at least one smooth curve frangible seal is produced by heat-sealing said first sheet of polymeric film to said second sheet of polymeric film and wherein the inner surface of at least one of said polymeric films comprises a blend of (a) a partially neutralized ethylene acid ionomer as the major component and (b) polybutene-1 homopolymer or copolymers as the minor component.

13. A flexible multiple-compartment beverage pouch as in claim 1, 2, 3, 4, 5, 6, 7, 8, or 9 wherein said at least one smooth curve frangible seal is produced by heat-sealing said first sheet of polymeric film to said second sheet of polymeric film and wherein the inner surface of at least one of said polymeric films comprises a blend of (a) a metallocene polyethylene as the major component and (b) polypropylene or polybutene-1 homopolymer or copolymers as the minor component.

14. A flexible multiple-compartment beverage pouch as in claim 1, 2, 3, 4, 5, 6, 7, 8, or 9 wherein said perimeter forms a closed pouch and said pouch is a stand-up pouch.

15. A flexible multiple-compartment pouch comprising:
(a) a first sheet of polymeric film;
(b) a second sheet of polymeric film superimposed on said first sheet of polymeric film wherein said first and second sheets of polymeric film are sealed to each other directly or indirectly through a third intervening polymeric film thus defining a generally rectangular sealed perimeter having a bottom end; an end opposing the bottom; and two opposed sides, forming a closed stand-up pouch;
(c) at least one smooth curve frangible seal internal to the sealed perimeter and said at least one smooth curve frangible seal divides said closed pouch into separated compartments comprising a first compartment and a second compartment; and
(d) a fluid confined to the first compartment wherein the seal strength of said sealed perimeter is sufficient to withstand manual compression of the fluid and the seal strength of said at least one smooth curve frangible seal is insufficient to withstand manual compression of the fluid thus allowing said fluid to commingle with the contents of the second compartment;
wherein the at least one smooth curve frangible seal extends from the end opposing the bottom to one of said opposed sides.

16. A flexible multiple-compartment pouch of claim 15 wherein said at least one smooth curve frangible seal delaminates upon sustained manual compression producing a pressure increase within said first compartment of up to 10 psig.

17. A flexible multiple-compartment pouch of claim 16 wherein the pressure increase is from 0.5 psig to 2.0 psig.

18. A flexible multiple-compartment pouch of claim 15 wherein said at least one smooth curve frangible seal has a seal strength of from 130 grams per inch to 5,000 grains per inch.

19. A flexible multiple-compartment pouch of claim 18 wherein the seal strength is from 1,000 grams per inch to 2,000 grams per inch.

20. A flexible multiple-compartment pouch of claim 15 wherein said at least one smooth curve frangible seal experiences a seal breaking force of between 400 grams per inch and 6,000 grams per inch upon sustained manual compression producing a pressure increase within said first compartment of from 0.5 psig to 5 psig.

21. A flexible multiple-compartment pouch of claim 15 wherein said pouch is a stand-up pouch.

22. A flexible multiple-compartment pouch as recited in claim 15, 16, 17, 18, 19, 20, or 21 wherein said at least one smooth curve frangible seal seals said first sheet of polymeric film to said second sheet of polymeric film and is produced by heat-seating or zone coating and the inner surface of at least one of said polymeric films comprises a blend of (a) 80 to 93 weight percent of an ethylene/acid ionomer wherein at least 50 weight percent of said ethylene/ acid ionomer is derived from ethylene comonomer and wherein the degree of neutralization of acid is from 5 to 45 percent and (b) 20 to 7 weight percent of a propylene/α-olefin copolymer wherein the α-olefin comonomer comprises 1 to 12 weight percent of said copolymer.

23. A flexible multiple-compartment pouch as recited in claim 15, 16, 17, 18, 19, 20, or 21 wherein said at least one smooth curve frangible seal seals said first sheet of polymeric film to said second sheet of polymeric film and is produced by heat-sealing or zone coating and the inner surface of at least one of said polymeric films at the frangible heat seal is a blend comprising (a) an acid modified ethylene vinyl acetate copolymer or acid modified ethylene methyl acrylate copolymer as the major component and (b) a partially neutralized ethylene acid ionomer as the minor component.

24. A flexible multiple-compartment pouch comprising a first sheet of polymeric film sealed to a second sheet of polymeric film with at least one smooth curve frangible seal produced by heat sealing or zone coating internal to the perimeter of said pouch wherein said pouch is a stand-up pouch; said at least one smooth curve frangible seal divides said pouch into separated compartments comprising a first compartment and a second compartment and experiences seal breaking force of from 400 grams per inch up to 6,000 grams per inch at a pressure increase of from 0.5 psig to 5 psig within the first or second compartment; the stand-up pouch is generally rectangular having a bottom, an opposing end to the bottom, and opposed sides to the bottom and the opposing end; and the at least one smooth curve frangible seal extends from the opposing end to one of said opposed sides.

25. A flexible multiple-compartment pouch comprising a first sheet of polymeric film sealed to a second sheet of polymeric film with at least one smooth curve frangible seal produced by heat sealing or zone coating internal to the perimeter of said pouch wherein said pouch is a stand-up pouch; said at least one smooth curve frangible seal divides said pouch into separated compartments comprising a first compartment and a second compartment and comprises at least one force concentrating means for selectively exceeding seal strength of said at least one smooth curve frangible seal by experiencing a seal breaking force of from 1,500 grams per inch up to 10,000 grams per inch at a pressure increase of from 0.5 psig to 10 psig within the first or second compartment; the stand-up pouch is generally rectangular having a bottom, an opposing end to the bottom, and opposed sides to the bottom and the opposing end; and the at least one smooth curve frangible seal extends from the opposing end to one of said opposed sides.

26. The flexible multiple-compartment pouch of claim 24 or 25 wherein the inner surface of at least one of said polymeric films comprises a blend of (a) 80 to 93 weight percent of an ethylene/acid ionomer wherein at least 50 weight percent of said ethylene/acid ionomer is derived from ethylene comonomer and wherein the degree of neutralization of acid is from 5 to 45 percent and (b) 20 to 7 weight percent of a propylene/α-olefin copolymer wherein the α-olefin comonomer comprises 1 to 12 weight percent of said copolymer.

27. The flexible multiple-compartment pouch of claim 24 or 25 wherein the inner surface of at least one of said polymeric films at the at least one smooth curve frangible seal is a blend comprising (a) an acid modified ethylene vinyl acetate copolymer or acid modified ethylene methyl acrylate copolymer as the major component and (b) a partially neutralized ethylene acid ionomer as the minor component.

28. The flexible multiple-compartment pouch of claim 24 or 25 wherein the inner surface of at least one of said polymeric films at the at least one smooth curve frangible seal is a blend comprising (a) a partially neutralized ethylene acid ionomer as the major component and (b) polybutene-1 homopolymer or copolymers as the minor component.

29. The flexible multiple-compartment pouch of claim 24 or 25 wherein the inner surface of at least one of said polymeric films at the at least one smooth curve frangible seal is a blend comprising (a) a metallocene polyethylene as the major component and (b) polypropylene or polybutene-1 homopolymer or copolymers as the minor component.

* * * * *

UNITED STATES PATENT AND TRADEMARK OFFICE
CERTIFICATE OF CORRECTION

| | | |
|---|---|---|
| PATENT NO. | : 7,055,683 B2 | Page 1 of 1 |
| APPLICATION NO. | : 10/454233 | |
| DATED | : June 6, 2006 | |
| INVENTOR(S) | : Raymond Anthony Bourque et al. | |

It is certified that error appears in the above-identified patent and that said Letters Patent is hereby corrected as shown below:

Col. 14, Line 46
Claim 5, line 46, "of front" should read -- of from --.

Col. 15, Line 54
Claim 15, line 54, "are scaled" should read -- are sealed --

Signed and Sealed this

Twentieth Day of February, 2007

JON W. DUDAS
*Director of the United States Patent and Trademark Office*